US010908277B1

(12) United States Patent
Roggendorf et al.

(10) Patent No.: US 10,908,277 B1
(45) Date of Patent: Feb. 2, 2021

(54) MAINTAINING POSITION RELATIVE TO AN AIR ANOMALY

(71) Applicant: Rockwell Collins, Inc., Cedar Rapids, IA (US)

(72) Inventors: Brian R. Roggendorf, Marion, IA (US); Stephen E. Tyson, Marion, IA (US); Jonathon C. Skarphol, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 457 days.

(21) Appl. No.: 15/648,373

(22) Filed: Jul. 12, 2017

(51) Int. Cl.
*G01S 13/95* (2006.01)
*G01S 17/95* (2006.01)
*G01W 1/02* (2006.01)
*G01W 1/08* (2006.01)
*G01W 1/00* (2006.01)

(52) U.S. Cl.
CPC ............ *G01S 13/953* (2013.01); *G01S 17/95* (2013.01); *G01W 1/02* (2013.01); *G01W 1/08* (2013.01); *G01W 2001/003* (2013.01)

(58) Field of Classification Search
CPC ............................... G01S 13/953; G01S 17/95
USPC ............................................... 342/26 R–26 D
See application file for complete search history.

(56) References Cited

U.S. PATENT DOCUMENTS

| | | | |
|---|---|---|---|
| 6,181,989 B1 * | 1/2001 | Gwozdecki | G05D 1/0808 |
| | | | 701/4 |
| 6,744,382 B1 * | 6/2004 | Lapis | G01C 23/005 |
| | | | 340/963 |
| 8,508,723 B2 * | 8/2013 | Chang | G01P 5/26 |
| | | | 356/28 |
| 9,620,025 B2 * | 4/2017 | Shams | G08G 5/0021 |
| 2003/0130791 A1 * | 7/2003 | McIntyre | G05D 1/0077 |
| | | | 701/472 |
| 2007/0104026 A1 * | 5/2007 | Rubin | G01W 1/10 |
| | | | 367/13 |
| 2010/0195089 A1 * | 8/2010 | Wu | G01P 5/20 |
| | | | 356/28.5 |
| 2012/0245835 A1 * | 9/2012 | Weitz | G08G 5/0013 |
| | | | 701/120 |

(Continued)

OTHER PUBLICATIONS

Pahle, Joe, et al., A Preliminary Flight Investigation of Formation Flight for Drag Reduction on the C-17 Aircraft, AIAA Atmospheric Flight Mechanics Conference, Mar. 7, 2012 Salt Lake City, UT, Aug. 13-16, 2012, p. 1-29, Minneapolis, MN.

*Primary Examiner* — Marcus E Windrich
(74) *Attorney, Agent, or Firm* — Suiter Swantz pc llc

(57) ABSTRACT

Separation distances between a platform and an air or weather anomaly such as a wake vortex are obtained. Airspeeds of the air or weather anomalies are detected. Maximum airspeeds determined from different detection paths may result one or more airspeed differentials. The one or more airspeed differentials may be used to determine a calculated separation distance. A position of the platform may be maintained or maneuvered relative to the air or weather anomaly based on the calculated separation distance. Control commands may be output to a vehicle control system to perform, direct, or display a navigational solution including maneuvering relative to the air or weather anomaly, where the vehicle control system may include a graphics controller, a flight control system, a flight management system, or an autopilot.

6 Claims, 12 Drawing Sheets

(56) References Cited

U.S. PATENT DOCUMENTS

| | | | |
|---|---|---|---|
| 2013/0221164 A1* | 8/2013 | Klooster | G05D 1/0005 |
| | | | 244/180 |
| 2014/0249738 A1* | 9/2014 | Euteneuer | G05D 1/106 |
| | | | 701/301 |
| 2017/0334576 A1* | 11/2017 | Shams | G08G 5/0039 |
| 2018/0126976 A1* | 5/2018 | Naserian | G08G 1/096791 |

* cited by examiner

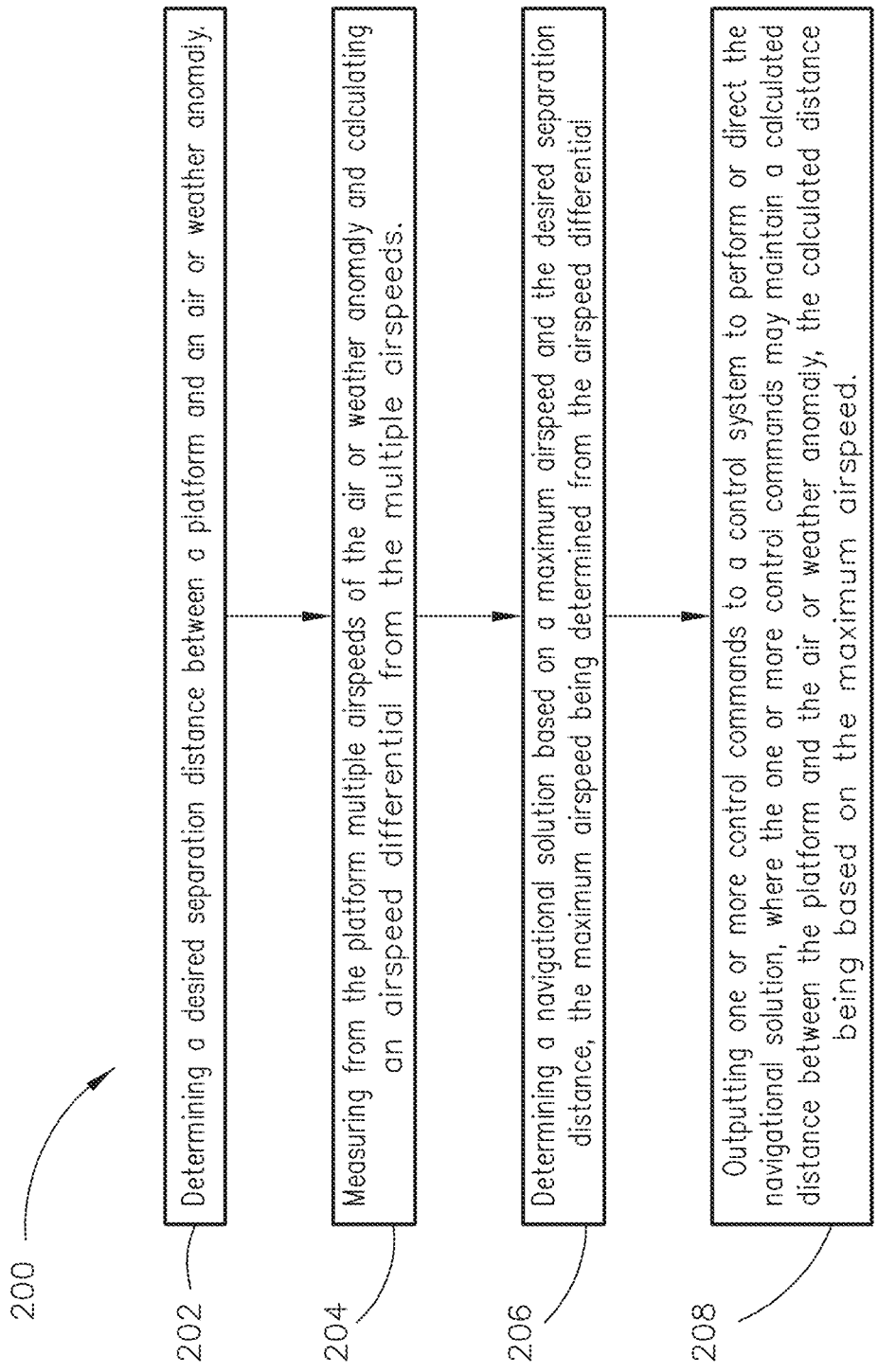

MAINTAINING POSITION RELATIVE TO AN AIR ANOMALY

BACKGROUND

Air and weather anomalies such as storms, plumes, air currents, jet streams, geostrophic winds, slipstreams, and other anomalies often have effect on vehicles traveling through, near, or around them, on structures, people, vehicles, or land formations in their path, and on mechanisms employed to measure them. If vehicles or machinery are designed to traverse a fluid medium such as air or water, and if an intensity of the air or weather anomalies increase, then the effects and impact of the air or weather anomalies often increase in severity.

The atmosphere, including the stratosphere and the troposphere—where most air travel occurs—consists of a substantial amount of molecules and particulate including micro- and nanoparticles entrapped or entrained within it. These molecules and particulate may agglomerate, disperse, or travel at rates similar or proportional to an intensity and overall energy of the air or weather anomalies due to kinetic and potential forces resulting from the air or weather anomalies.

The mechanisms employed for measuring, tracking, or analyzing the air and weather anomalies lack accuracy, require frequent deicing, are adversely affected by environmental conditions, or otherwise need improving. Studies regarding the use of atmospheric molecules and particulate as an aid in measuring, tracking, or analyzing the air and weather anomalies have become or are becoming an area of interest.

Resultant aerodynamic force is due to opposing or orthogonal components, lift and drag. Optimizing interactions of these two opposing or orthogonal forces has been a goal in aviation since the beginning. Increased knowledge of a size or shape of air and weather anomalies will help with the optimization of the opposing or orthogonal components and with optimizing interactions with the air and weather anomalies.

SUMMARY

In one aspect the inventive concepts disclosed herein are directed to a system for maintaining a position relative to an air or weather anomaly. The system may include a platform and a sensor coupled to the platform for measuring airflow in multiple directions relative to the platform. The system may include a guidance controller, a non-transitory memory having instructions thereon, and a processor in communication with the non-transitory memory. The processor of the system may be configured to access the instructions to perform or direct steps, where the steps may include: obtaining a desired separation distance between a platform and an air or weather anomaly, measuring an airspeed from the air or weather anomaly to determine an airspeed differential, determining a navigational solution based on the airspeed differential and the desired separation distance, where the navigational solution includes one or more control commands for maneuvering relative to the air or weather anomaly, and outputting the one or more control commands to the guidance controller to perform or direct the navigational solution.

In a further aspect, the inventive concepts of the present disclosure are directed to an apparatus for maintaining a position relative to an air or weather anomaly. The apparatus may include one or more ports for receiving a first input from a database or a data structure. The one or more ports of the apparatus may receive a second input from a first detector of a sensor and a third input from a second detector of the sensor. The one or more ports may output one or more control commands for directing or controlling a platform relative to an air or weather anomaly. In another aspect, the apparatus may include a processor configured to access a non-transitory memory with instructions thereon for: obtaining a separation distance from the first input, measuring a first airspeed along a first path from the second input, measuring a second airspeed along a second path from the third input, determining a navigational solution including one or more control commands based on the separation distance and an airspeed differential calculated using the first airspeed and the second airspeed, and outputting the one or more control commands. In another aspect, the one or more control commands that are output may include a guidance control for maneuvering relative to the air or weather anomaly.

In a further aspect, the inventive concepts of the present disclosure are directed to a method for maintaining a position relative to an air or weather anomaly. The method may include the following steps: obtaining a desired separation distance between a platform and an air or weather anomaly, measuring an airspeed from the air or weather anomaly to determine an airspeed differential, determining a navigational solution based on the airspeed differential and the desired separation distance, where the navigational solution includes one or more control commands for maneuvering relative to the air or weather anomaly, and outputting to a control system the one or more control commands to perform or direct the navigational solution.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 12 is an exemplary embodiment of a method for positioning a platform relative to an air or weather anomaly, according to the inventive concepts disclosed herein.

DETAILED DESCRIPTION OF EXEMPLARY EMBODIMENTS

Figure 1:
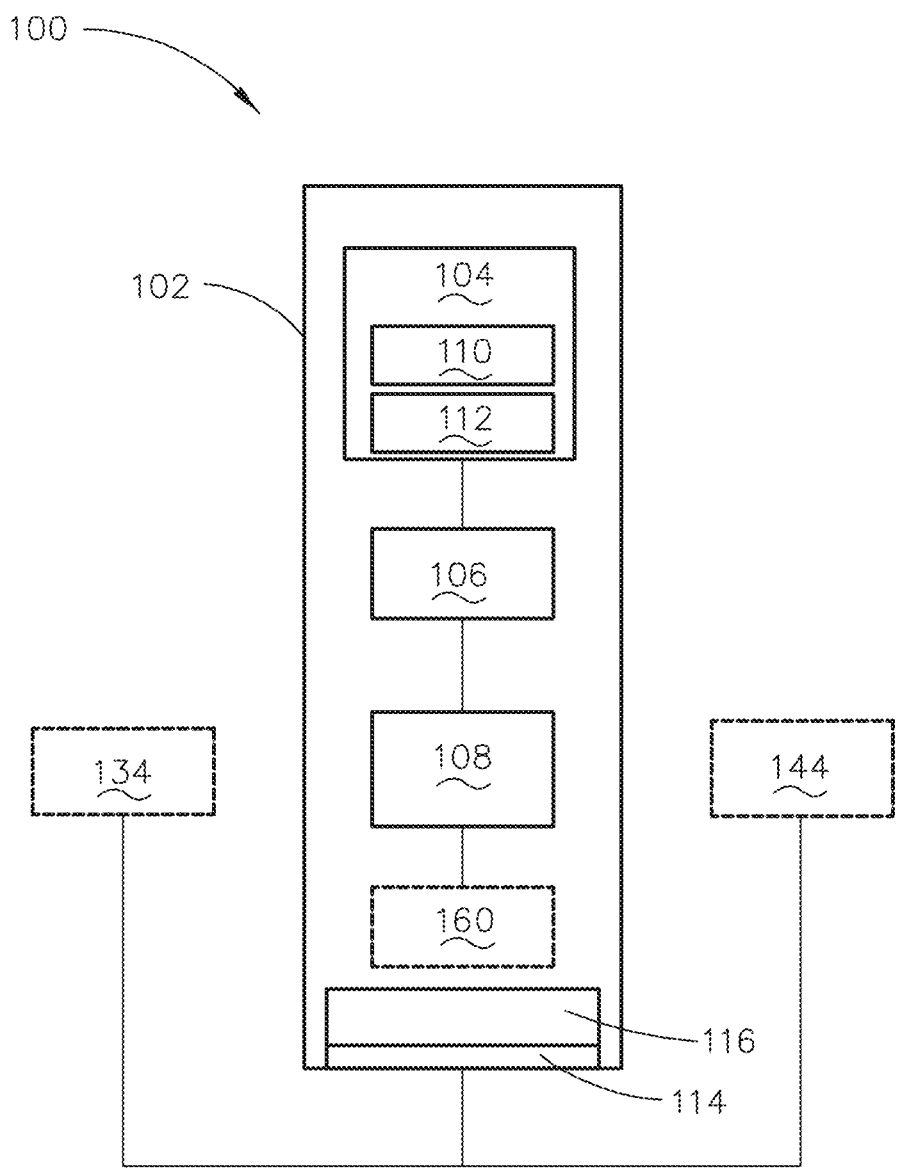
FIG. 1 is an exemplary embodiment of a system for maintaining a position of a platform relative to an air or weather anomaly, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Air or weather anomaly" or "anomalies" as used herein shall mean a deviation from standard air flow, normal air flow, or stagnant air, and shall include, but is not limited to, anomalies such as storms, plumes, air currents, jet streams, geostrophic winds, slipstreams, eddies, vortices such as wake vortices, and combinations thereof.

"Maximum Doppler Distance" (MDD) as used herein shall mean a highest sensed Doppler return or a highest sensed Doppler shift measured, analyzed, or observed along a detection path or along a path of a sensor.

"Airspeed differential" as used herein shall mean an observable, measureable, or detectable difference in airflow as related to a velocity, an acceleration, or a moment (e.g., as with rotation about a point) of the airflow at a first location as compared to a second location, at a first radius as compared to a second radius of the same location, or at a first point in time as compared to a second point in time. It is noted that the term may refer to and/or encompass a velocity, acceleration, or a moment of a particle or particulate entrapped or entrained within the airflow of an air or weather anomaly.

"Memory" as used herein, and unless otherwise specified, means any temporary or permanent storage medium known in the art suitable for storing program instructions (e.g., computer executable program code) executable by an associated one or more processors. Memory may also be stored in an organized format, encompassing, for example, a database. Memory may include one or more storage mediums. For example, memory may include, but is not limited to, a read-only memory, a random access memory, a magnetic or optical memory device (e.g., disk), a magnetic tape, a solid state drive, or combinations thereof. In embodiments, memory includes a buffer (e.g., frame buffer) and/or a cache. The memory includes non-transitory memory. In embodiments, the memory may be located remotely with respect to a platform for which it is used.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"Doppler blueshift" as used herein shall mean a decrease in wavelengths and an increase in frequency of an emitted electromagnetic wave due to a relative motion of the electromagnetic wave and due to its interactions with particulate/molecules entrained within a medium through which it travels. This effect may be due to the interacting particles/molecules being closer, thereby resulting more of a "shift" on a blue end of the electromagnetic spectrum as compared to the effect of a "Doppler redshift". As used herein, the detected "shift" is not confined to detections within the visible light spectrum.

"Doppler redshift" as used herein shall mean an increase in wavelengths and a decrease in frequency of an emitted electromagnetic wave due to a relative motion of the electromagnetic wave and due to its interactions with particulate/molecules entrained within a medium through which it travels. This effect may be due to the interacting particles/molecules being further away, thereby resulting more of a "shift" on a red end of the electromagnetic spectrum as compared to the effect of a "Doppler blueshift". As used herein, the detected "shift" is not confined to detections within the visible light spectrum.

Broadly, the inventive concepts disclosed herein are directed to systems including anemometers and anemometer configurations for determining a relative position, location, size, shape, or velocity profile with respect to an air or weather anomaly in order to more efficiently or safely interact with the air or weather anomaly. For example, an anemometer configuration may result a navigational solution including one or more beneficial maneuvers. The one or more beneficial maneuvers may increase a safety level related to interacting with the air or weather anomaly, more accurately position a mobile platform with respect to the air or weather anomaly, provide increased fuel economy to the mobile platform, provide advanced warning of adverse or severe conditions, or may provide combinations thereof.

With respect to safety, an ability to maintain a safe position of a mobile platform with respect to an air or weather anomaly is obtained with more accuracy or precision by a navigational system via computational analysis of a location, a size, and/or a velocity profile of the air or weather anomaly. For example, the navigational system may maintain, or help others maintain, a safe position relative to a wake vortex, a storm, or a hurricane as it detects multiple different airspeeds along one or more sensor or detector paths in order to determine a peak or maximum airspeed along the one or more sensor or detector paths. The peak or maximum airspeed may be mathematically correlated with a predetermined safe separation distance required for airspeeds of that magnitude. As long as maneuvers are generated by the navigational system to maintain the mathematical correlation, the separation distance is maintained. The one or more maneuvers produced may include safety procedures for operators, occupants, and/or vehicles located at or near the air or weather anomaly. When two or more peak or maximum airspeeds are measured, a shape, size, or velocity profile approximation of the air or weather anomaly may be determined. Depending on the shape, size, or velocity profile approximation, additional safety protocols may be generated.

With respect to fuel economy, an increased accuracy, increased precision, or a reduction in fuel consumption of or by the systems and devices disclosed herein are obtained by accounting for a movement, a location, a size, and/or a velocity profile of the wake vortex of a lead aircraft. For example, a trailing aircraft flying in formation is able to reduce fuel consumption by ten percent or more if it maintains a specific position or a range of positions relative to the wake vortex of the lead aircraft.

Referring now to FIG. 1, an exemplary embodiment of a system 100 for maintaining a position or a separation distance relative to an air or weather anomaly is depicted. The system 100 includes a platform 102, an anemometer 104, a memory 106, and a processor 108. In some embodiments, a position or separation distance of the platform 102 is maintained relative to a wake vortex.

In some embodiments, the platform 102 may include, but is not limited to, a ground station, a Range Control Officer (RCO), an airport tower, and/or a ground-based transceiver. In other embodiments, the platform 102 may include a mobile platform such as precision guided equipment, machinery, vehicles, or aircraft including manned (e.g., passenger, cargo, tactical, etc.) and unmanned (e.g., unmanned aerial vehicles (UAVs) or unmanned aircraft systems (UASs)) aircraft, water, naval, land-based, or other similar vehicles, vessels, or machinery.

In some embodiments, the anemometer 104 includes a light source 110 and a detector 112. For example, the detector 112 may include a camera, a photodetector, or a photomultiplier that receives or images light having a waveform that is equivalent or similar to a waveform of the light source 110. For instance, the light source 110 may include a laser light source (e.g., diode pumped solid state laser, a Ti-sapphire laser, or combinations thereof) and the detector 112 may be configured to detect light from the light source 110 that is scattered and/or reflected back to the detector 112. In an exemplary embodiment, the laser light source is an eye-safe laser light source.

In some embodiments, the light source 110 includes an ultra violet (UV) light source. In some embodiments, the anemometer 104 includes a Laser Doppler Velocimetry (LDV) sensor. In other embodiments, the anemometer 104 is any sensor that relies on the Doppler Effect. For example, the anemometer 104 may include a light detection and ranging (LIDAR) sensor configured for detecting one or more Doppler blueshifts and/or one or more Doppler redshifts.

In an exemplary embodiment, the anemometer 104 may be attached or coupled to the platform 102. In this regard, the anemometer 104 may be positioned with respect to the platform 102 in order to measure air flowing in multiple directions (i.e., the air includes multi-directional flow, where the multi-directional characteristic is multi-directional with respect to the platform 102, with respect to a source of the air or weather anomaly, or with respect to a detection path). In this regard, the anemometer 104 may include multiple anemometers 104. In some embodiments, at least one anemometer 104 of the multiple anemometers 104 is accurate to +/−1 knot with a minimum measurement range of from −50 to +200 knots.

In an exemplary embodiments, the system 100 includes a port 114. In some embodiments, the port 114 may be implemented as a single, bi-directional port. For example, a fiber optic coupler such as a 3 dB, 50:50 (coupling ratio) bidirectional coupler may be used. In other embodiments, the port 114 includes one or more input ports and one or more output ports.

In an exemplary embodiment, the system 100 may include a data guard 116 for monitoring all communications into and out of system 100. For example, the data guard 116 may be programmed, attached, and or associated with a module, partition, or an API to inspect communications that occur with the respective module, partition, or API and ensure compliance with a ruleset. For example, the ruleset may include, but is not limited to, a protocol, definition, or data configuration (e.g., output from safety monitor requires at least two parameters including an attitude and an altitude to move the platform). In this regard, the data guard may be tasked with enforcing the ruleset. It is noted that although FIG. 1 only depicts one data guard 116, this depiction is not meant to be limiting. For example, each module and/or partition of system 100 receiving or transmitting data may include the data guard 116.

Figure 2:
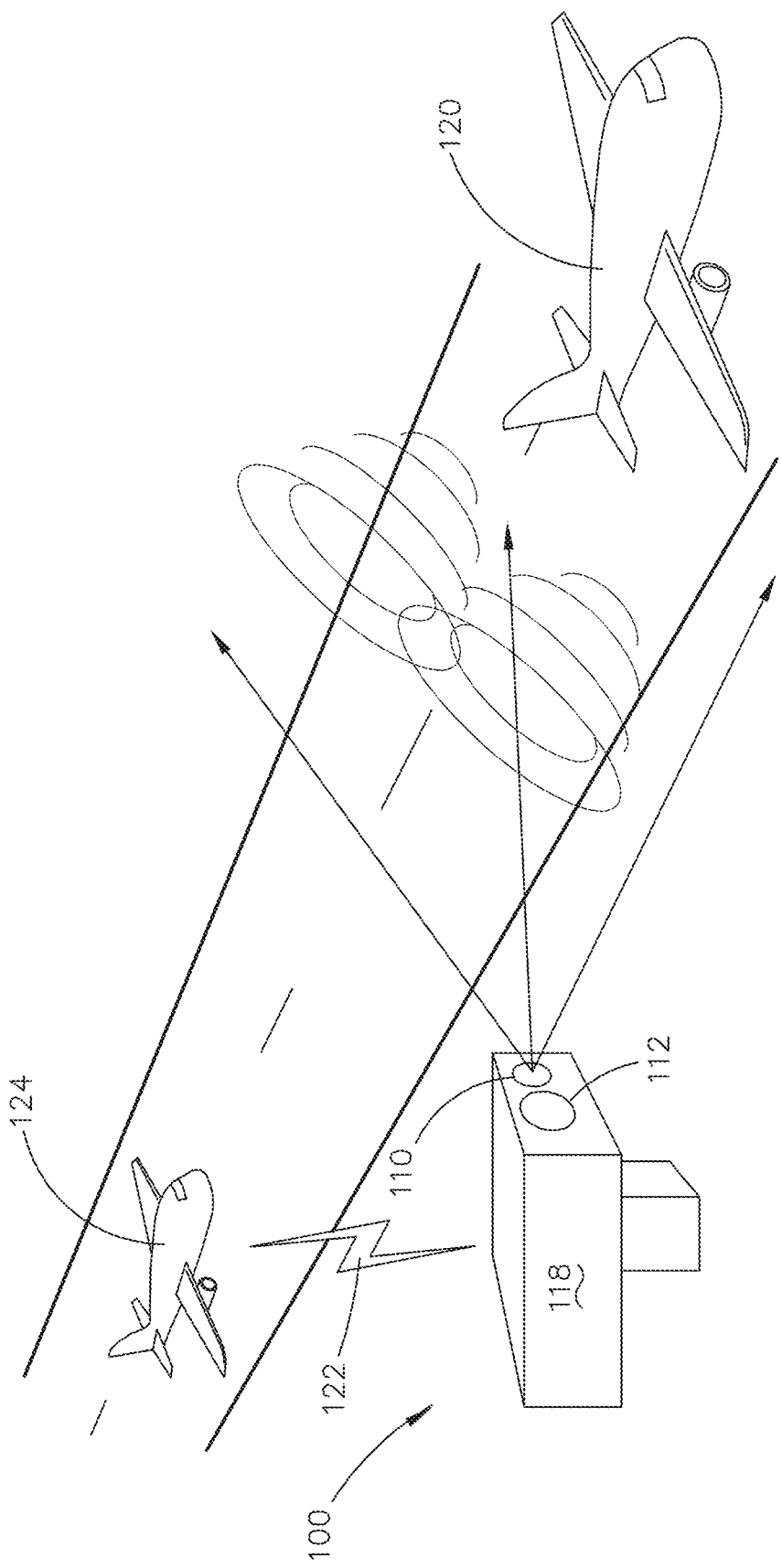
FIG. 2 is an exemplary embodiment of a system for maintaining a position of a platform relative to an air or weather anomaly, according to the inventive concepts disclosed herein.

Referring now to FIG. 2, a fixed transceiver embodiment of the navigational system 100 is depicted. For example, the platform 102 may include a fixed transceiver 118 located on or near a runway and positioned to detect airspeeds from one or more wake vortices from a lead aircraft 120 to transmit a signal via a link 122 (e.g., wireless, Ethernet, Link16, Control and Non-Payload Communications (CNPC), or combinations thereof) to a trailing aircraft 124. Because multiple different airspeeds will exist along a detection path, calculating an airspeed differential, or performing a maximizing/minimizing function on returns indicating the different airspeeds may yield a maximum or a peak airspeed along the detection path.

In some embodiments, the platform 102 for the navigational system 100 includes a vehicle, and the anemometer 104 is attached to the vehicle to maximize longevity and durability of the anemometer 104. For example, the anemometer 104 may be attached to a surface within the vehicle and positioned such that the light source 110 and the detector 112 point out of, or are directed through, a window or a similar protective substrate of the vehicle. By way of another example, the anemometer 104 may be attached to an exterior portion of the vehicle and covered by a transparent protective substrate (e.g., similar to a radome). In other embodiments, the protective substrate may not be transparent but is at least configured to allow light of the wavelength of light source(s) 110 to pass through.

Figure 3:
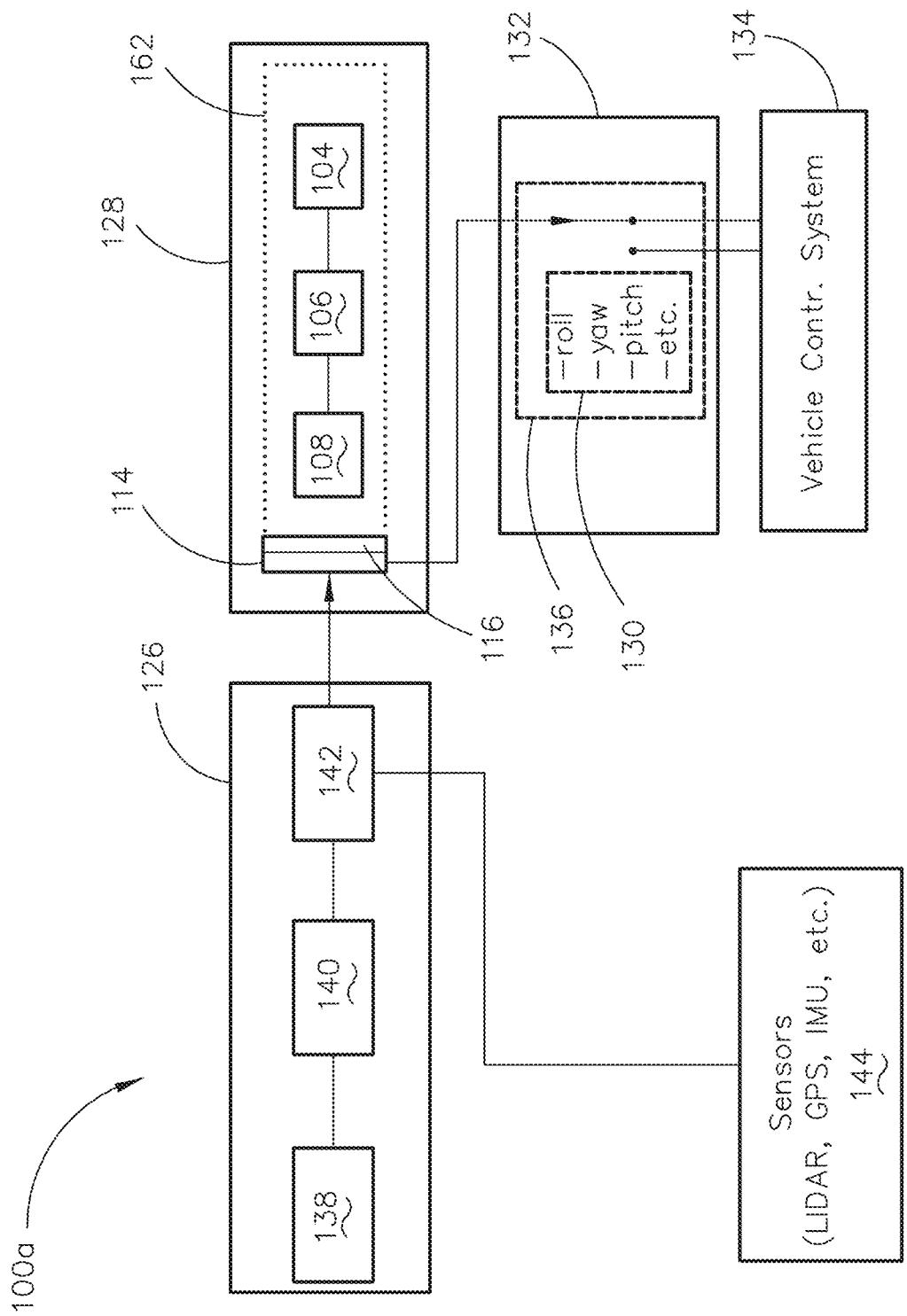
FIG. 3 is an exemplary embodiment of a system for maintaining a position of a platform relative to an air or weather anomaly, according to the inventive concepts disclosed herein.

Referring now to FIG. 3, an exemplary embodiment of a navigational system 100*a* is depicted. It is noted that system 100*a* may function similarly to system 100 except that system 100*a* may be attached to a mobile platform 102 and/or system 100*a* may be implemented by a kernel operating system or a partitioned operating system. For example, the processor 108 may be coupled with a RELNAV module 126 and a machine learning module 128 to implement a machine learning algorithm such as a neural network to determine appropriate control commands 130 or appropriate maneuvers that maintain a position of the platform 102 relative to the air or weather anomaly. For instance, the platform 102 may include a drone and the neural network of the machine learning module 128 may perform or direct artificial intelligence (AI) decisions or transitions between states of the neural network. A safety monitor 132 (e.g., module, logic, or circuitry) may be used to ensure that control commands 130 output to the vehicle control system 134 (e.g., guidance controller, Flight Management System (FMS), Flight Control System (FCS), and/or autopilot) are within a predetermined threshold, baseline, or a safety envelope 136. If the control commands 130 are not within the safety envelope 136, then the safety monitor 132 switches to predetermined control commands for performing or directing a predetermined, safe maneuver (e.g., return to base, turn away, etc.).

Figure 4:
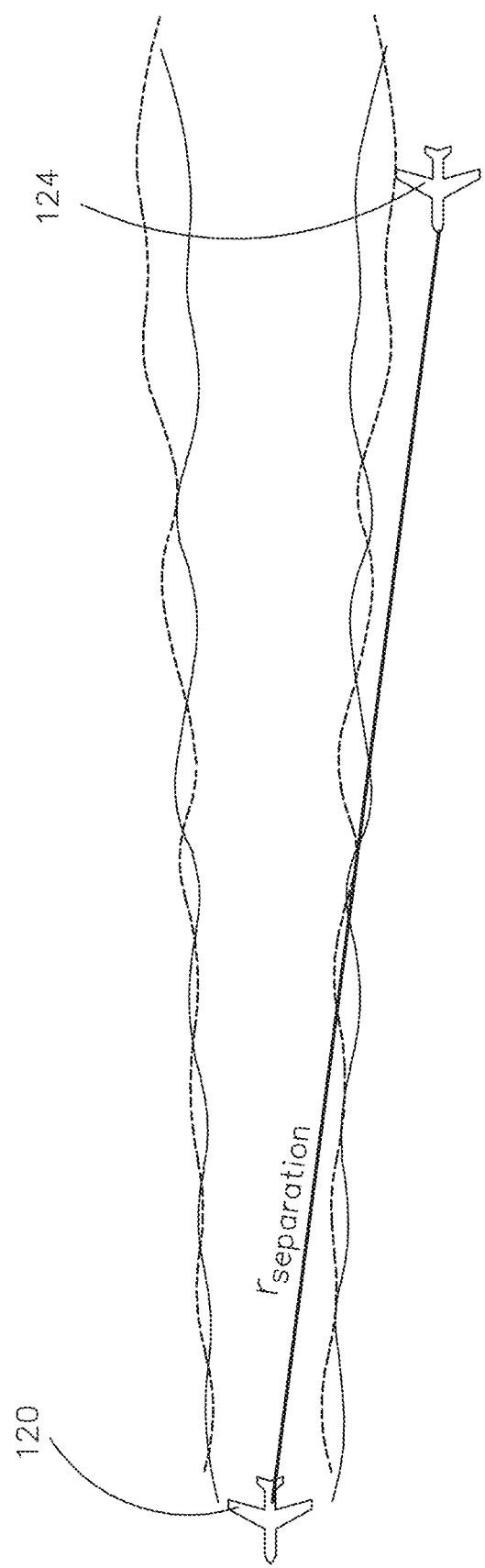
FIG. 4 is an exemplary embodiment of a separation distance, according to the inventive concepts disclosed herein.

In some embodiments, the RELNAV module 126 includes an input sensor 138 such as a camera (e.g., digital, stereoscopic, time-of-flight (TOF), structured light, or combinations thereof), an image processor 140 for performing or directing a relative navigation (RELNAV) algorithm such as a simultaneous localization and mapping (SLAM) algorithm, and a fusion module or sub-system 142. The fusion module or sub-system 142 may receive inputs from multiple sensors including two or more of anemometers 104, detectors 112, and navigational sensors 144. The fusion module or sub-system 142 may be tasked with determining which sensors (e.g., anemometers 104 or sensor 144) to use for respective processes. For example, if RELNAV with respect to a wake vortex is being performed or directed, then the fusion module or sub-system 142 may prioritize input from anemometers 104 or detectors 112 for vertical and lateral guidance control and incorporate input from sensors 144 for determining longitudinal guidance control. For instance, referring now to FIG. 4, determining longitudinal guidance control may include determining a longitudinal range or separation distance relative to a radius of the lead aircraft 120.

In some embodiments, the anemometer 104 and processor 108 may be configured to determine a longitudinal range between a lead aircraft 120 and a trailing aircraft 124. For example, during a calibration phase, a correlation of the measured airspeed from anemometer 104 and a distance between the lead and the trailing aircraft may be determined and stored in a database or a data structure such as a table. For instance, multiple airspeeds may be measured at specific time increments, and different radiuses of separation as measured by radar (e.g., navigational sensor 144) may also be recorded at the same time increments. Accordingly, a look-up table, a regression model, a polynomial fit, some other data fit, or combinations thereof, may be developed or performed. During a run-time, real-time, or operational phase, the processor 108 may be configured to look-up in the database, look-up in the data structure, or use a data fit to correlate a subsequent airspeed measured from anemometer 104 with a longitudinal range. In this regard, a longitudinal separation distance of trailing aircraft 124 may be determined based on a specific airspeed of a wake vortex of the lead aircraft 120 detected by anemometer 104.

In some embodiments, the longitudinal separation distance is initially determined by anemometer 104 but then updated by one or more navigational sensors 144. In other embodiments, the longitudinal range is detected, initially determined, and maintained by the one or more navigational sensors 144. For instance, the one or more navigational sensors 144 may include a range sensor such as a radar receiver or other radar components (e.g., transmitter, antenna, and processor) for bistatic radar, continuous wave radar, monopulse radar, passive radar, planar array radar, pulse-Doppler radar, synthetic aperture radar, over-the-horizon radar, or combinations thereof. The one or more navigational sensors 144 may also include a GPS receiver, a differential GPS receiver, an ADS-B receiver, another precision navigation system, an inertial measurement unit (IMU), a radio for performing angle of arrival (AOA) or time difference of arrival (TDOA), or combinations thereof. In some embodiments, the one or more navigational sensors 144 provide an absolute position of platform 102.

Figure 5:
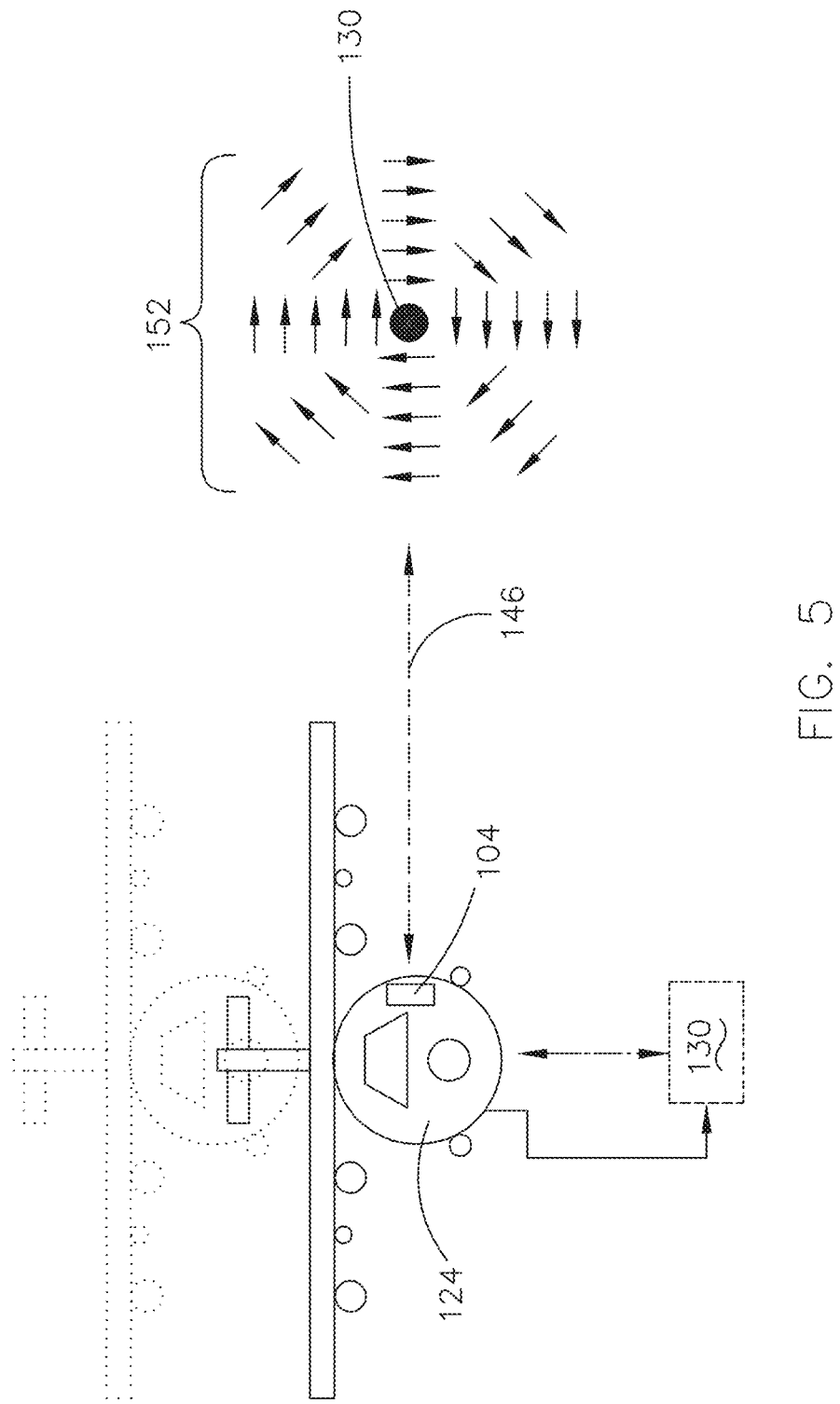
FIG. 5 is an exemplary embodiment of positioning a platform relative to an air or weather anomaly, according to the inventive concepts disclosed herein.

Referring now to FIG. 5, in an exemplary embodiment, the anemometer 104 is positioned with respect to a mobile platform 102 to detect or receive light in a direction that is generally orthogonal to a direction of travel of the mobile platform 102. For example, a direction of flight of trailing aircraft 124 may generally be parallel with a boresight of the aircraft 124, and the anemometer 104 or one or more detectors 112 may be positioned on the aircraft 124 to detect light in a direction that is orthogonal the direction of flight. For instance, a detection path 146 of the anemometer 104, or detection paths of multiple detectors 112, may be represented as a vector or multiple vectors within a plane, where the plane is orthogonal to the direction of flight.

Figure 6:
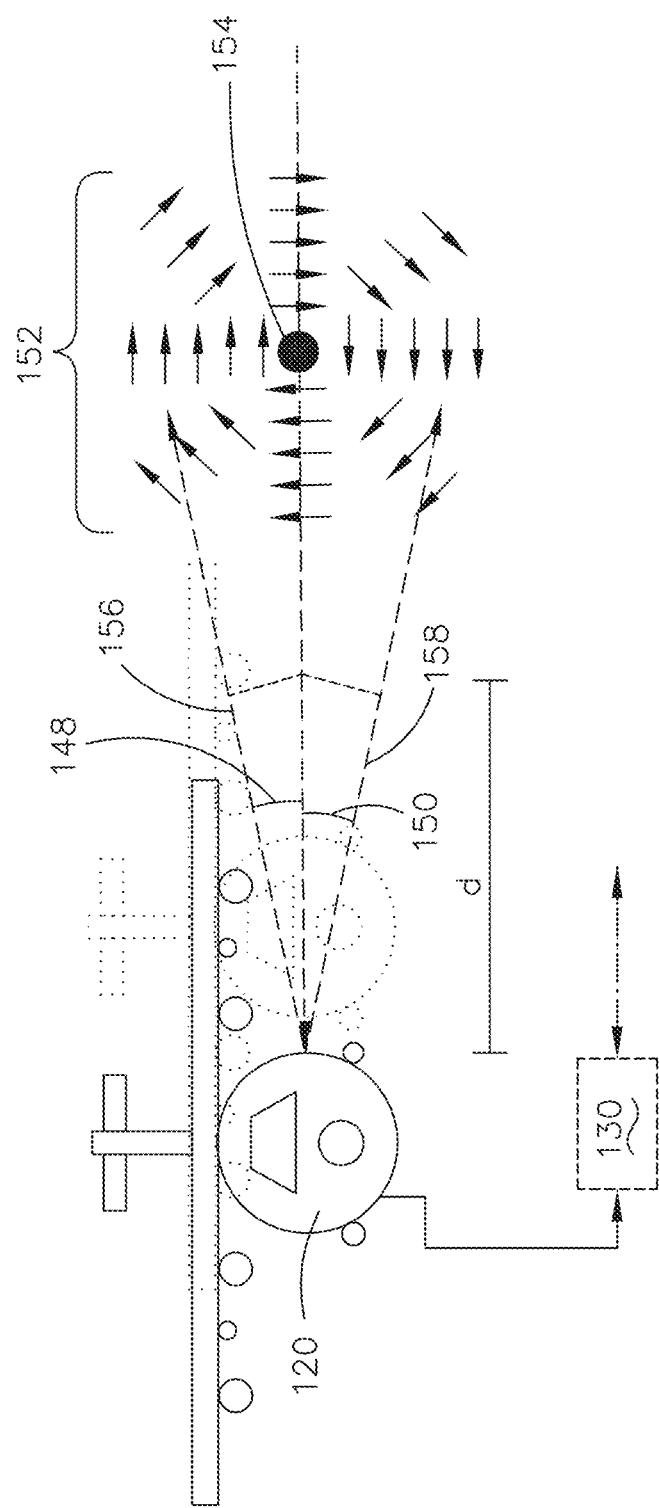
FIG. 6 is an exemplary embodiment of positioning a platform relative to an air or weather anomaly, according to the inventive concepts disclosed herein.
Figure 7:
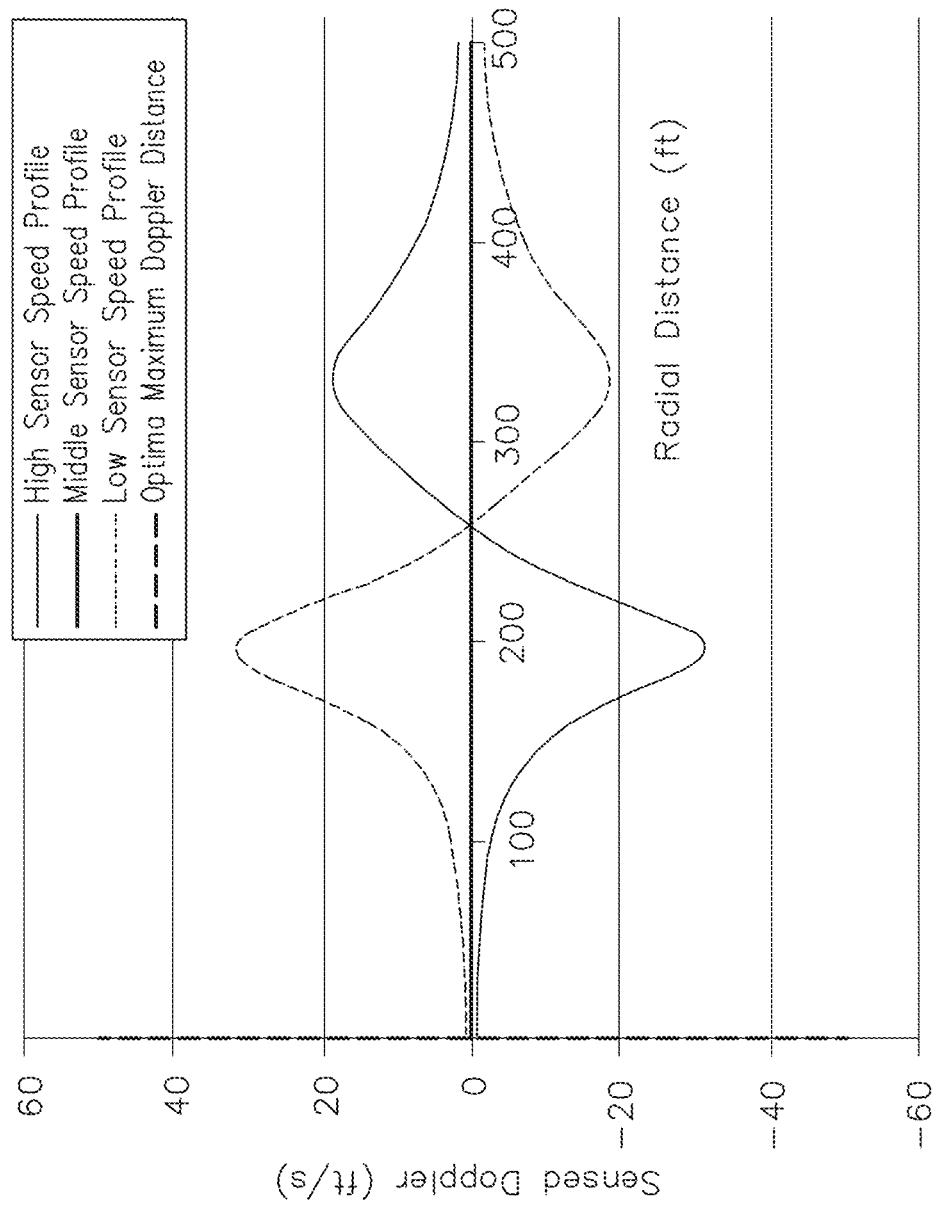
FIG. 7 is an exemplary embodiment of Doppler returns, according to the inventive concepts disclosed herein.

In some embodiments, the anemometer 104, the light source 110, or the detector 112 respectively include multiple anemometers 104, multiple light sources 110, or multiple detectors 112 to emit and/or detect along multiple paths. For example, a first light source of the multiple light sources 110 may be positioned to emit or radiate light along a first path, a second light source of the multiple light sources 110 may be positioned to emit or radiate light along a second path, and a third light source of the multiple light sources 110 may be positioned to emit or radiate light along a third path, where at least two of the first, second, and third paths are separated by an angle, theta (θ). In this regard, a first detector, a second detector, and a third detector of the multiple detectors 112 may be respectively positioned to individually collect light from either the first, second, or third light source of the multiple light sources 110 with at least two detectors being separated by the angle, theta. For example, referring now to FIG. 6, the angle, theta (θ) 148 may be an elevation angle with respect to a wing axis or a roll axis of the aircraft 124, and may be at least ten degrees (10°) in elevation above or below the wing or roll axis.

In some embodiments, anemometers 104 and/or detectors 112 are separated by a second angle, omega (ω) 150. For example, the air or weather anomaly may be asymmetrical along at least one axis, and thus the angle theta 148 and the angle omega 150 may be different angles. In other embodiments, the angles theta 148 and omega 150 are substantially equivalent angles.

In some embodiments, at least one anemometer of the multiple anemometers 104 points in a direction parallel to the direction of travel. For example, the mobile platform 102 may include an aircraft that has at least one anemometer of the multiple anemometers 104 configured for weather detection, requiring one or more returns from a path parallel to the direction of flight.

In an exemplary embodiment, separate paths of the multiple anemometers 104 or the multiple detectors 112 may enable a detection of different wavelength shifts that correlate airspeed (or speed of molecules/particulate entrained therein) with a position of the platform 102 relative to a source of the air or weather anomaly. For example, a lower anemometer/detector of multiple anemometers 104 orthogonal to a direction of flight may return multiple detected blueshifts that indicate a range of airspeeds, where a peak detected blueshift may correlate with a maximum airspeed of the airspeed differentials of the wake vortex 152. If the maximum airspeed is maintained at $d*\cos(\theta)$, this will indicate the aircraft 124 is at a position of $d*\cos(\theta)$ relative to the wake vortex 152. By way of another example, an upper sensor/detector may return multiple detected redshifts that indicate a range of airspeeds, where a peak detected redshift may correlate with a maximum airspeed of the wake vortex 152 that if maintained at $d*\cos(\theta)$ will indicate the platform is at a position of $d*\cos(\theta)$ relative to the wake vortex 152. By way of yet another example, a middle or horizontal anemometer may return multiple detected redshifts and multiple detected blueshifts, each providing vertical guidance or vertical offset with respect to the wake vortex 152 and the mobile platform 102. For instance, a detected blueshift may indicate that an aircraft is too low with respect to an optimal position (e.g., "sweet spot") in the wake vortex for maximum fuel economy; whereas a detected redshift may indicate that the aircraft is too high.

In an exemplary embodiment, the processor 108 is configured to determine a Maximum Doppler Distance (MDD) for each anemometer 104 of the multiple anemometers or each detector 112 of the multiple detectors. The MDD may be derived from anemometer/detector returns for each path of separate paths.

In some embodiments, the processor 108 uses the MDD as a reference to produce control commands 130 that maintain a position of the aircraft 124 relative to the wake vortex 152. For example, a first horizontal anemometer 104 or detector 112 may be configured to sense, detect, or calculate airspeeds including one or more airspeed differentials along the horizontal detection path 146. Because detected/sensed/calculated airspeeds along a horizontal center axis of wake vortex 152 from a wingtip 154 of the lead aircraft 120 may cancel each other out, a computed MDD along the horizontal detection path 126 may be equalized, or a setpoint to be maintained by a controller receiving the output of the horizontal anemometer 104 may be set at zero. For instance, a blueshift may be detected, indicating the trailing aircraft 124 is too low, successivley the processor 108 may be configured with a control algorithm, including but not limited to, proportional, integral, differential, and/or feedback control, to generate vertical guidance control commands 130 that attempt to equalize the MDD or maintain a position of trailing aircraft 124 such that the detected blueshift is minimized.

By way of another example, referring again to FIG. 6, second and third angled anemometers 104 or angled detectors 112 may be configured respectively to sense or detect airspeeds and calculate airspeed differentials along first diagonal detection path 156 and second diagonal detection path 158.

In an exemplary embodiment, calculated airspeed differentials along diagonal paths 156 and 158 relative to the wake vortex 152 may provide one or more maximum or peak airspeeds of the wake vortex 152. Using the maximum or peak airspeeds, a computed MDD along either of the diagonal paths 156 or 158 may be maintained at a position of $d*\cos(\theta)$. For instance, a redshift detected by the anemometer 104 or detector 112 coinciding with path 156 may include a first maximum airspeed that should be maintained at an MDD coinciding with $d*\cos(\theta)$; thus one or more lateral guidance control commands 130 are produced to maintain a position of the trailing aircraft 124 at $d*\cos(\theta)$ with respect to the first maximum airspeed of the wake vortex 152. Processor 108 may produce a similar maneuver for a second anemometer 104 or detector 112 coinciding with path 158 and a second maximum airspeed detected along the path 158. Thus, the processor 108 may be configured with a control algorithm to generate lateral or horizontal guidance control commands 130 that maintain the MDD of one or more diagonal sensors/detectors at a calculated distance (e.g., $d*\cos(\theta)$).

It is noted that the calculated distance may be applicable to other air or weather anomalies used as references to position or reposition platforms other than aircraft. It is further noted that calculated distances other than $d*\cos(\theta)$ may be encompassed by the inventive concepts disclosed herein depending on where a maximum or peak airspeed of the air or weather anomaly may be found with respect to a velocity profile of the air or weather anomaly. For example, another calculated distance may be $d*\tan(\theta)$, where d is a vertical distance to a center of the air or weather anomaly. Other calculated distances for maintaining a position of a platform relative to the air or weather anomaly will be recognized by those skilled in the art and are intended to be encompassed by the inventive concepts of the present disclosure.

In some embodiments, because a wake vortex may have a substantially circular velocity profile, the detection paths 156 and 158 are maintained, respectively, at just above and just below upper and lower bounds of the wake vortex (e.g., with respect to a velocity profile of the air or weather anomaly). In other embodiments, the velocity profile of the air or weather anomaly may include multiple different shapes, and the detection paths 156 and 158, or MDDs for the detection paths, may be maintained with respect to a desired separation distance and maximum or peak airspeeds for a respective shape.

In some embodiments, the detection of airspeeds along paths 156 and 158 may result in a second separation distance (e.g., 2*d*tan(θ)) calculated between the detected maximum or peak airspeeds. The second separation distance may be calculated to further or more accurately indicate a size or shape of the air or weather anomaly.

In an exemplary embodiment, particles or molecules in the path of the anemometer(s) 104 or light source(s) 110 may have a different absorptive rate depending on temperature, density, chemical composition, or other characteristics of the particles or molecules. In this regard, the anemometer(s) 104, light source(s), 110 and/or detector(s) 112 may be tuned according to characteristics of particles or molecules in the atmosphere including, but not limited to, temperature characteristics, density characteristics, composition characteristics, and combinations thereof.

In some embodiments, the system 100 includes a separate display 160 for displaying a size, shape, velocity profile, or a warning associated with the air or weather anomaly. For example, referring again to FIG. 1, the display 160 may be a display separate and independent from a primary flight display (PFD). For instance, the platform may be a fixed transceiver and the display 160 may located on an aircraft on the runway. By way of another example, the display 160 may be temporarily installed within or onto platform 102 for accomplishing a mission.

In some embodiments, the display of a warning or alert with respect to an air or weather anomaly may be accompanied by an auditory signal (e.g., tone, voice command or warning, beep, or combinations thereof). In some embodiments, the warning or alert may be accompanied by a "stick shaker" or a "stick pusher" response. For example, a pilot flying beyond a threshold distance with respect to the wake vortex may receive a vibration applied to the control throttle, warning the pilot that the threshold distance has been crossed or is no longer being maintained with respect to the wake vortex.

In some embodiments, the separate display 160 may incorporate haptic technology (e.g., include a touch screen), and/or it may be voice activated/deactivated. In this regard, voice commands or touch input may be given to acknowledge a warning, confirm the warning, indicate action to be taken in response to the warning, or combinations thereof.

In some embodiments, one or more navigational sensors 144 may include a back-up anemometer. For example, the back-up anemometer may include a mechanical (e.g., vane) anemometer, a hot-wire anemometer, an ultrasonic anemometer, an acoustic resonance anemometer, a pitot tube, or combinations thereof. In some embodiments, the anemometer 104 and/or the back-up anemometer 104 may be heated.

In some embodiments, one or more modules, systems, or sub-systems of system 100 may be implemented as partitions of a partitioned operating system. For example, information within respective partitions may be accessible by an ARINC 653 operating system. For instance, at least anemometer 104, memory 106, and processor 108 may be implemented as an individual partition.

In some embodiments, one or more modules, systems, partitions, or sub-systems may be implemented individually or combinationally on a single device 162. For example, one or more modules may be implemented on a portable computing device (e.g., tablet computer), as a line replaceable unit (LRU), a system on a chip (SOC), a Field Programmable Gate Array (FPGA), an application specific integrated circuit (ASIC), or combinations thereof.

Referring now to FIGS. 7-11, embodiments of Doppler returns from first, second, and third anemometers 104 are depicted. An exemplary embodiment of Doppler returns indicated in FIG. 7 may represent an ideal condition for returns from a position of the aircraft 124 relative to the wake vortex 152, or "sweet spot" conditions, for the trailing aircraft 124. Because the trailing aircraft 124 may be relatively located within the "sweet spot", the gain of the guidance controller for vertical and lateral guidance controls of the aircraft 124 will be zero. In other words, because the airspeed differentials between the upper and lower anemometers are at their maximum obtainable values, based on the respective airspeeds of the wake vortex and a position of the trailing aircraft 124 relative to the wake vortex, and because there are no peaks in the Doppler returns of the middle or horizontal anemometer, no vertical or lateral/horizontal guidance controls will be output to adjust a position of the aircraft 124. Nevertheless, in some embodiments, despite being in the "sweet spot" an output to an aileron and/or to adjust a trim may be given in order to maintain the position in the "sweet spot".

Figure 8:
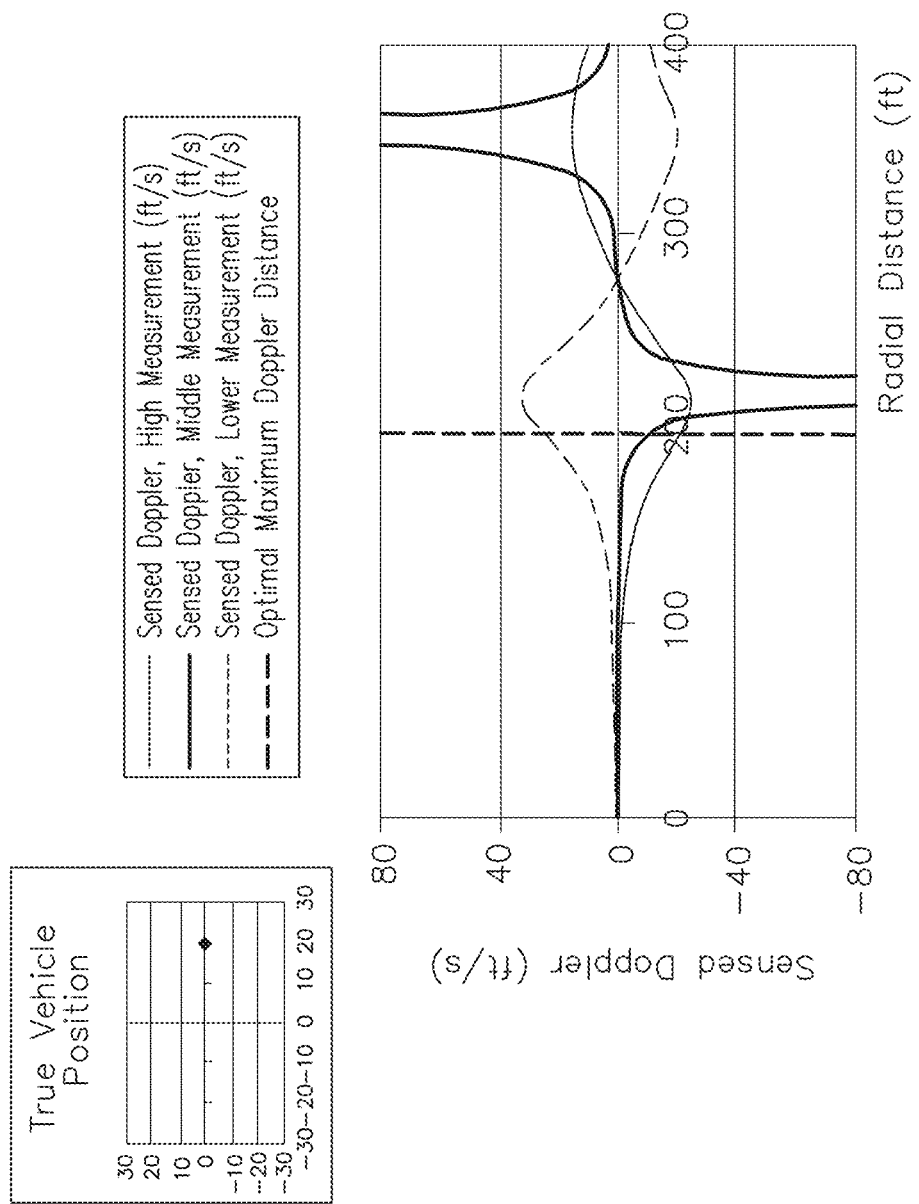
FIG. 8 is an exemplary embodiment of Doppler returns, according to the inventive concepts disclosed herein.

An exemplary embodiment of Doppler returns as depicted in FIG. 8 may represent returns from the trailing aircraft 124 when it is out of the "sweet spot". For example, with respect to a cross-track of the wake vortex 152 (where the cross-track is parallel to the horizontal center axis of the wake vortex) the trailing aircraft 124 may be laterally too far away from the "sweet spot", despite maintaining an appropriate vertical position—as indicated by the 'True Vehicle Position'.

Figure 9:
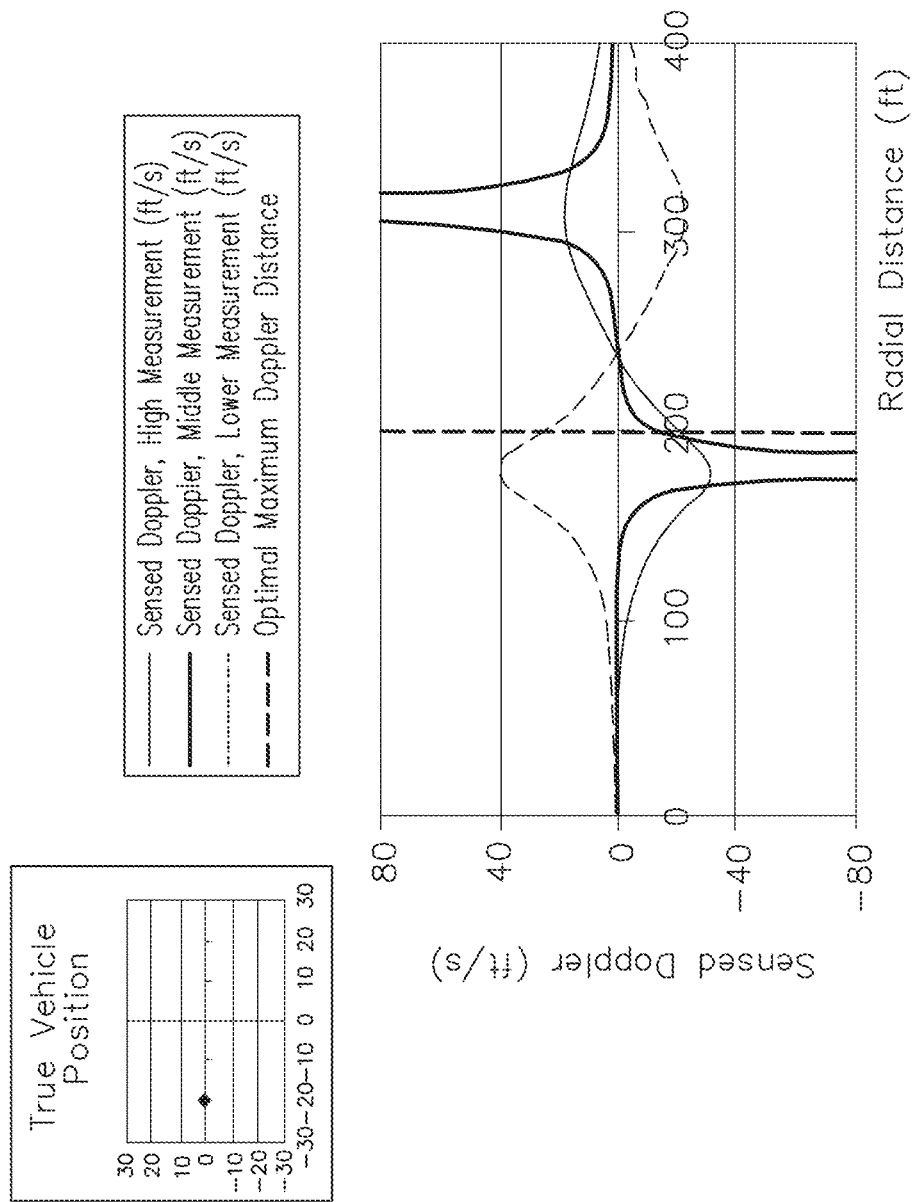
FIG. 9 is an exemplary embodiment of Doppler returns, according to the inventive concepts disclosed herein.

An exemplary embodiment of Doppler returns as depicted in FIG. 9 may represent returns from the trailing aircraft 124 when it is out of the "sweet spot" and too close to a downwash of the wake vortex 152.

Figure 10:
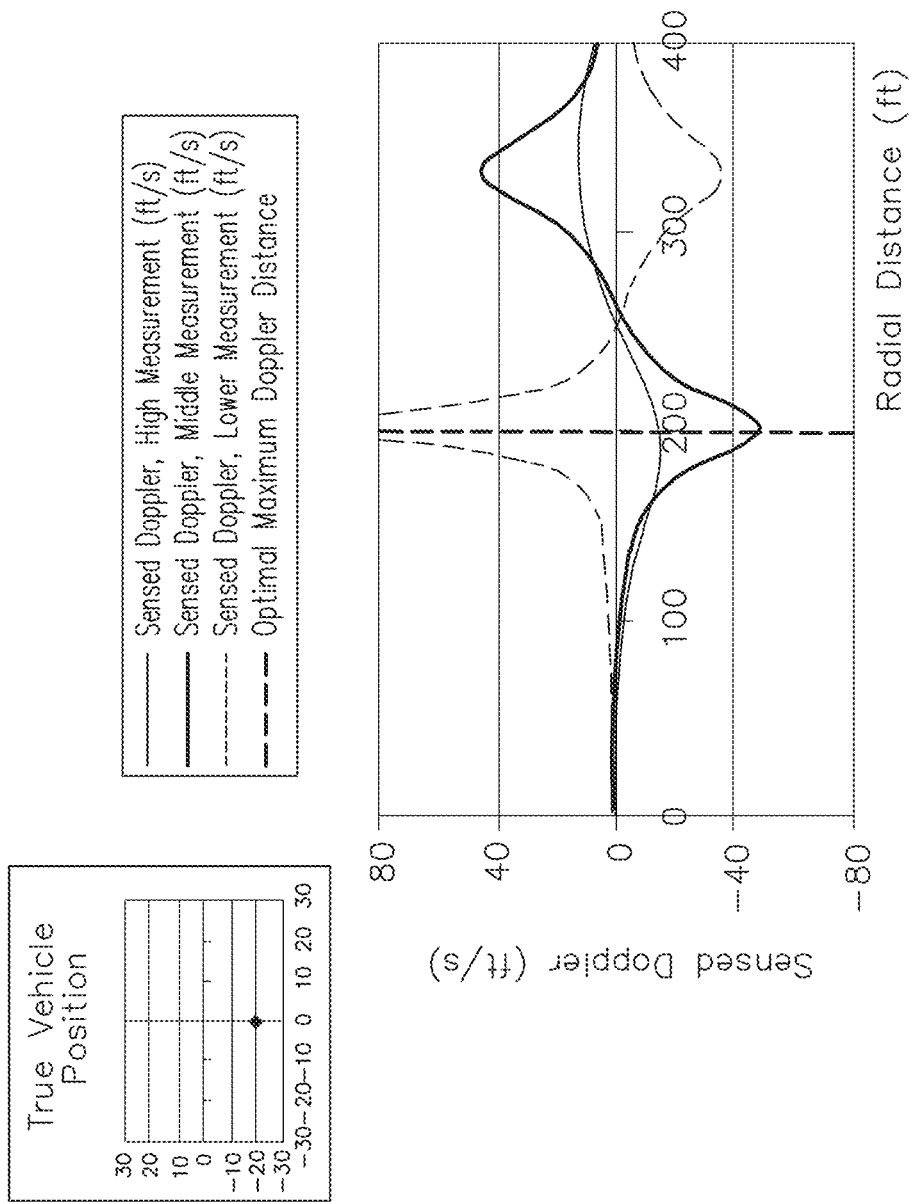
FIG. 10 is an exemplary embodiment of Doppler returns, according to the inventive concepts disclosed herein.

An exemplary embodiment of Doppler returns as depicted in FIG. 10 may represent returns from the trailing aircraft 124 when it is too low with respect to the "sweet spot".

Figure 11:
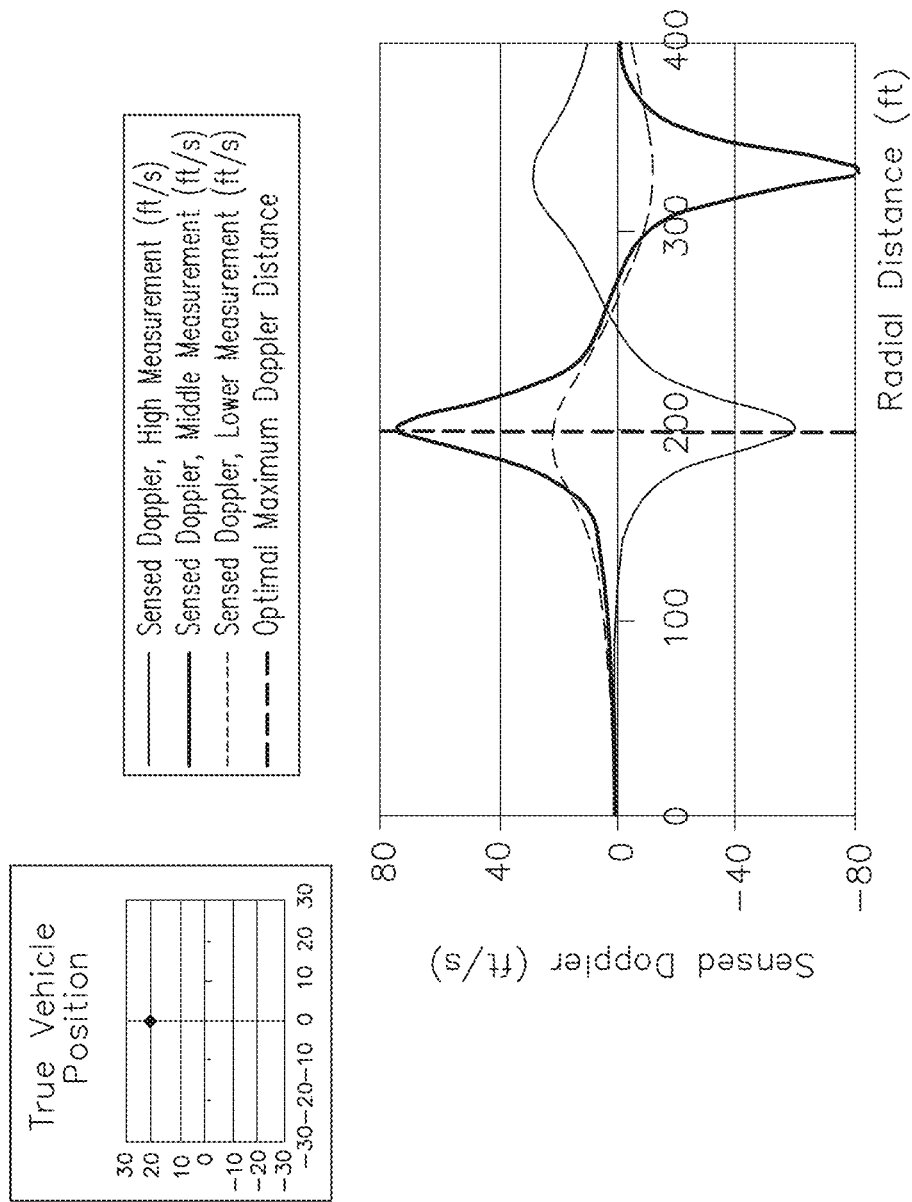
FIG. 11 is an exemplary embodiment of Doppler returns, according to the inventive concepts disclosed herein.

An exemplary embodiment of Doppler returns as depicted in FIG. 11 may represent returns from the trailing aircraft 124 when it is too high with respect to the sweet spot.

Without limiting the inventive concepts disclosed herein to any specific scientific principle for any or all attendant advantages, it is noted that the wake vortex of a leading aircraft may increase a turbulence of airflow, which may produce an advantageous lift on the trailing aircraft. Maintaining the "sweet spot" enables the trailing aircraft to beneficially position itself in the "sweet spot" to increase lift, reduce drag, and thereby reduce an amount of thrust and fuel consumption required. In other words, the aircraft is akin to a surfboard, riding atop turbulent flow with minimum thrust requirements as long as an appropriate position is maintained with respect to the turbulent flow.

Referring now to FIG. 12 an exemplary embodiment of a method 200 according to the inventive concepts disclosed herein may include one or more of the following steps. For example, the method 200 may be a method for determining a position of a platform relative to an air or weather anomaly.

A step 202 may include determining a desired separation distance between a platform and an air or weather anomaly. For example, a "sweet spot" may be characterized as a range of positions provided such that if a trailing aircraft stays in the range of positions during formation flight (e.g., caravan, tactical formation, etc.), increased fuel economy of greater than or equal to 6-10% is obtained. In some embodiments, the "sweet spot" is determined based on measurements of size and airspeed of the wake vortex of a lead aircraft and a longitudinal separation distance between the lead aircraft and a trailing aircraft. For example, the wingtip of the lead aircraft may be the source of the wake vortex, and if the trailing aircraft is approximately 914.4 meters (or 3,000 feet) behind a nose-tip of the lead aircraft, then the "sweet spot"

may be determined by multiple anemometers 104 and may range from +/−12.19 meters (or 40 feet) above, below, left, or right of a center of the wake vortex. In other embodiments, the "sweet spot" may range from 9.14 meters (or 30 feet) above, below, left, or right of a center of the wake vortex.

In some embodiments, the desired separation distance between the platform and the air or weather anomaly may be determined based on the lead aircraft. For example, a RELNAV system on the trailing aircraft may image the lead aircraft and determine a position of the trailing aircraft relative to the wingtip of the lead aircraft. The "sweet spot" may be determined based on the position relative to the wingtip of the lead aircraft. For instance, the "sweet spot" may range from 6.1 meters (or 20 feet) to 15.2 meters (50 feet) away from the wingtip of the lead aircraft, where "away" means moving further outwards from a center, longitudinal axis of the lead aircraft. By way of another example, the "sweet spot" may include a center, longitudinal axis (e.g., boresight) of the trailing aircraft being separated along a crosstrack, or having a lateral separation distance, of approximately 42.7 meters (or 140 feet) to 54.9 meters (or 180 feet), and a vertical offset from a wing axis of the lead aircraft of from 9.14 meters (or 30 feet) above or below the wing axis of the lead aircraft.

In some embodiments, determining the desired separation distance may include accessing and retrieving from a data structure (e.g., table) safe or optimum (e.g., for fuel economy) separation distances based on the platform type. For example, separation distances for larger aircraft on a runway may be different than separation distances for smaller aircraft on the runway. By way of another example, a database, a table, or other data structure may developed that correlates aircraft type with one or more calibrated separation distances for maximum fuel economy relative to a wake vortex of a lead aircraft. In this regard, determining the desired separation distance may include obtaining from the database, table, or data structure the separation distance(s) that correspond to maximum fuel economy during formation flight.

A step 204 may include measuring from the platform an airspeed of the air or weather anomaly for determining an airspeed differential. For example, a first detector or a first sensor may measure a first airspeed, and at least a second sensor or a second detector may measure a second airspeed. Based on the first and second airspeeds, an airspeed differential may be determined. In some embodiments, determining the airspeed differential may include determining a size, shape, or velocity profile of the air or weather anomaly. For example the first airspeed may indicate an upper bound of a wake vortex, and the second airspeed may indicate a center or a lower bound of the wake vortex. Based on the airspeed differential resulting from the first and second measured airspeeds, the size, shape, or velocity profile of the wake vortex may be determined. In some embodiments, a third airspeed is detected, further solidifying the shape, size, or velocity profile of the air or weather anomaly.

A step 206 may include determining a navigational solution based on the airspeed differential determined in step 204 and the desired separation distance determined in step 202. For example, the navigational solution may include a RELNAV solution including a maneuver and a control command for performing the maneuver. For instance, referring now to FIG. 6, a platform may include a ground station at an airport, and a sensor for measuring the wake vortex (e.g., anemometer 104 or detector 112) may be configured to measure airspeeds from the wake vortex of a first aircraft in the take-off stage of flight. The ground station may simultaneously sense a position of a second aircraft in a taxiing stage or taxi mode (e.g., via receipt of ADS-B signal, radar sensor, or other sensing means). In this regard, the navigational solution determined by the ground station may include a control command that is generated after taking into account a safe separation distance between two aircraft on a runway (e.g., from 7,408 to 14,816 meters or 4 NM to 8 NM, depending on a respective size of the two aircraft). The navigational solution may include a 'Stop' or a 'Warning: too close to wake vortex' signal that is communicated (e.g., wirelessly—via Ethernet, Link16, or other communication link) and displayed on a display (e.g., display 160) of the second aircraft. The signal may further include a brake control command for a braking system of the second aircraft if no action results (i.e., second aircraft continues to get closer in proximity to the wake vortex of the first aircraft) from displaying the 'Stop' or 'Warning' signal.

By way of another example, determining the navigational solution of step 206 may include generating a RELNAV solution that includes a control command for a maneuver that maintains a position of the trailing aircraft relative to the wake vortex of a lead aircraft during formation flight for fuel economy. For instance, the control command may include a trim adjustment for a left and/or right aileron.

In some embodiments, step 206 may include prioritizing control commands. For example, multiple control commands may be prioritized, a control command of the multiple control commands may be based on an MDD, and two or more control commands based on an MDD may be prioritized by processor 108. For instance, a first control command may be generated for longitudinal guidance control, a second control command may be generated for lateral guidance control, and a third control command may be generated for vertical guidance control. The first control command for the longitudinal guidance control may be prioritized for output above the second and third control commands. The second control command may be based on a first MDD of upper or lower anemometers. The third control command may be based on a second MDD of a horizontal or middle anemometer. In this regard, the second control command may be prioritized for output above the third control command. For example, referring again to FIG. 8, although peaks are indicated in the returns of the middle or horizontal anemometer, these peaks may be resolved by first laterally adjusting a position the aircraft 124 in order to maintain the MDD at $d*\cos(\theta)$ prior to outputting any vertical guidance control commands based on the detected peaks.

A step 208 may include outputting one or more control commands to a control system to perform or direct the navigational solution determined in step 206. For example, the ground station platform may be in communication with a vehicle control system such as a directional/steering/braking control system of the second aircraft, such that the directional/steering/braking control system of the second aircraft receives the output (e.g., control command including the warning and the braking signal, if the warning is not heeded), and the output, being received as input for the directional/steering/braking control system, results brakes being applied to the second aircraft before the second aircraft enters an unsafe region (e.g., as determined by the separation distance of step 202).

By way of another example, the outputting of one or more control commands of step 208 may include outputting a trim adjustment command to an FCS, FMS, or autopilot to maintain a position of the trailing aircraft with respect to the wake vortex of the lead aircraft during formation flight. For instance, the trim adjustment may help maintain an MDD of one or more sensors of the trailing aircraft at a calculated distance (e.g., d*cos(θ)).

In some embodiments, the outputting of one or more control commands of step 208 may include outputting rendering commands to a graphics controller to display on display 160 directions for performing a maneuver relative to the air or weather anomaly, a warning or an alert, a location, size, shape, or velocity profile of the air or weather anomaly, or combinations thereof. For example, on a runway, a pilot of a second aircraft may roll-out a flexible emissive display 160 from a storage compartment mounted within the second aircraft and receive instructions regarding when it is and is not safe to proceed further onto the runway with respect to a wake vortex of a first aircraft.

In some embodiments, the outputting of one or more control commands of step 208 may include outputting a control command to a safety monitor prior to outputting the control command to an autopilot. If the safety monitor determines the output will result a maneuver that is within a threshold or safety envelope of operation, then the control command is output to the autopilot.

In some embodiments, the outputting of one or more control commands of step 208 may include outputting a control command to maintain a maximum airspeed differential. For example, a first airspeed detected by an upper sensor may be of similar magnitude but opposite direction of a second airspeed detected by a lower sensor, such that if an airspeed differential between Doppler returns of the two sensors is maximized, then a position of the trailing aircraft may be maintained with respect to the outer (e.g., upper and lower) bounds of the wake vortex.

In some embodiments, the outputting of one or more control commands of step 208 may include outputting a control command to maintain a zeroed or minimum airspeed differential. For example, airspeeds detected by a horizontal sensor may be of similar magnitude and opposite direction along a horizontal center axis of the wake vortex, such that a position of the trailing aircraft may be maintained to obtain a zeroed or minimized MDD. For instance, Doppler returns measured at the horizontal sensor may include redshifts corresponding to equivalent blueshifts that cancel each other out at the sensor.

In some embodiments, the outputting of one or more control commands at step 208 may include outputting a control command when a triggering event occurs. For example, a set-point of the vertical guidance controller may correspond to Doppler returns from a middle or horizontal anemometer, such that an airspeed or range of airspeeds (e.g., +/−2 ft/s) detected by the horizontal or middle anemometer may trigger one or more vertical guidance commands 130. For instance, any airspeed detected or any airspeed detected above or below the threshold range may trigger a vertical guidance command 130 for the aircraft 124, where the threshold range may be determined with respect to "sweet spot" conditions.

In some embodiments, the outputting of one or more control commands of step 208 may include adjusting a gain of a controller. For example, a gain of the guidance controller corresponding to lateral or horizontal movement may increase to reposition the aircraft 124 laterally in order to maintain an MDD at d*cos(θ).

In some embodiments, the outputting of one or more control commands at step 208 may include outputting a control command to compensate for a sideslip effect in guidance logic of the guidance controller. For example, input to the horizontal or middle anemometer may be weighted to account for the sideslip. For instance, the weighting may be based on a sideslip angle, beta (B), a velocity of the platform, and/or an airspeed.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system for maintaining a position relative to an air or weather anomaly, comprising:
   a platform, the platform includes a first aircraft;
   a sensor system coupled to the platform for measuring airflow in a plurality of directions relative to the platform, the sensor system including plurality of detectors, the plurality of detectors including a first detector positioned to measure the airflow along a first path and a second detector positioned to measure the airflow along a second path, the first and second paths being orthogonal to a direction of flight of the first aircraft, the first path oriented with respect to a horizontal plane parallel with the wing of the first aircraft and is an angle theta (θ) above the horizontal plane, the second path is oriented with respect to the horizontal plane of the wing of the first aircraft and is an angle omega (ω) below the horizontal plane, each detector of the plurality of detectors includes an anemometer, a light source, and at least one of a camera, a photodetector, or a photomultiplier;
   a guidance controller;
   a non-transitory memory having instructions thereon; and
   a processor in communication with the non-transitory memory, the processor configured to access the instructions to perform or direct steps, the steps comprising:
      receiving a separation distance between a platform and an air or weather anomaly;
      measuring an airspeed from the air or weather anomaly to determine an airspeed differential;
      determining a navigational solution based on the airspeed differential and the separation distance, the navigational solution including one or more control commands for maneuvering relative to the air or weather anomaly; and
      outputting the one or more control commands to the guidance controller to perform, direct, or display the navigational solution, wherein the first detector is configured to detect a first Doppler shift from a first plurality of Doppler returns along a first detector path, and the second detector is configured to detect a second Doppler shift from a second plurality of Doppler returns along a second detector path.

2. The system of claim 1, wherein the processor is configured to determine a maximum Doppler distance (MDD) for each detector of the first detector and the second detector, wherein the MDD comprises a highest sensed Doppler shift or a highest sensed Doppler return from the respective plurality of returns from each of the first detector and the second detector.

3. The system of claim 2, wherein the one or more control commands comprise one or more vertical guidance control commands to minimize the MDD for the first detector and one or more horizontal or lateral guidance control commands to maintain the MDD at a calculated distance from the platform based on the separation distance.

4. The system of claim 1, wherein the at least one of a camera, a photodetector, or a photomultiplier is configured to receive light having a waveform that is equivalent to a waveform of the light source.

5. The system of claim 1, wherein the light source is a laser light source.

6. The system of claim 1, wherein the anemometer includes a light detection and ranging (LIDAR) sensor configured for detection of one or more Doppler blueshifts and/or one or more Doppler redshifts.

* * * * *